United States Patent

[11] 3,575,510

| [72] | Inventor | Tadao Kohashi<br>Yokohama, Japan |
|---|---|---|
| [21] | Appl. No. | 717,725 |
| [22] | Filed | Apr. 1, 1968 |
| [45] | Patented | Apr. 20, 1971 |
| [73] | Assignee | Matsushita Electric Industrial Co., Ltd.<br>Osaka, Japan |
| [32] | Priority | Apr. 17, 1967 |
| [33] | | Japan |
| [31] | | 42/25,031 |

[54] IMAGE CORRECTION DEVICE
5 Claims, 9 Drawing Figs.

[52] U.S. Cl. .......................................... 355/67,
355/71
[51] Int. Cl. ................................................ G03b 27/76
[50] Field of Search ........................................... 355/38,
67—71

[56] References Cited
UNITED STATES PATENTS

| 2,988,978 | 6/1961 | Craig | 355/70X |
| 3,085,469 | 4/1963 | Carlson | 355/38X |
| 3,110,805 | 11/1963 | Currie | 355/67X |

*Primary Examiner*—John M. Horan
*Assistant Examiner*—Richard A. Wintercorn
*Attorney*—Stevens, Davis, Miller & Mosher ABSTRACT: A device for correcting an image formed on a photographic film, having a layer of a radiation-sensitive luminescent material disposed opposite to the photographic film. The luminescent layer acts as a source of light having an intensity distribution corresponding to the relative light transmissivity of the image on the film and the light from the light source is projected on the film thereby correcting the contrast of the original image.

PATENTED APR 20 1971 3,575,510

INVENTOR

Tadao Kohashi

BY Stevens, Davis, Miller & Mosher

ATTORNEYS

IMAGE CORRECTION DEVICE

This invention relates to a device for projecting an image carried by a photographic film or the like on a sensitive sheet while suitably correcting the image so as to obtain a print of such a corrected image.

According to conventional practice for directly observing an image, which is formed on a photographic film or the like by modulating the light transmissivity thereof by means of a signal, or for obtaining a print of such an image by projecting it on a sensitive sheet, light 1 of uniform intensity is projected on a film 2, and the light 3 penetrated or passed through the film 2 is directly observed or projected on a sensitive sheet as seen in FIG. 1. Accordingly, the relative density, that is, the contrast of the picture thus obtained remains the same as that of the image formed on the film 2. In other words, an image having a low contrast is obtained when the image carried by the film 2 is flat and has a very low contrast, and an image having an excessively sharp contrast is obtained when conversely the image carried by the film 2 has a high relative density and an excessively sharp contrast. This results in an extreme inconvenience not only for direct observation of such an image but also for obtaining a positive picture by printing the image on a sensitive sheet. It is therefore common practice, in the case of a photographic print, that the type of sensitive sheet to be used is merely selected in an effort to compensate for the original contrast of an image carried by a photographic film.

It is therefore a primary object of the present invention to provide an image correcting device comprising a planar light source which has an intensity distribution corresponding to the relative light transmissivity of an image to be directly observed or to be projected on a sensitive sheet so as to freely control the characteristic of the image as well as to obtain a positive having any desired tone.

The above and other objects, advantages and features of the present invention will be apparent from the following description with reference to the accompanying drawings, in which.

Figure 1:
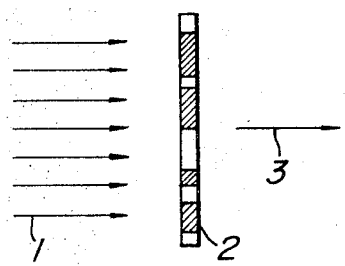
FIG. 1 is a diagrammatic view showing the conventional image display system described previously.
Figure 2:
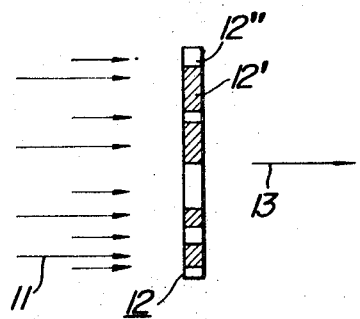
FIG. 2 is a diagrammatic representation of the principle on which the present invention is based.

Referring to FIG. 2 illustrating the principle upon which the present invention is based, the intensity of incident light 11 is modulated to suit a specific image carried by a recording sheet 12 which is to be directly observed or projected on a sensitive sheet to obtain a print. For example, when the image carried by the recording sheet 12 has an excessively high relative density, the intensity of the portion of the light 11 entering a portion 12′ having a low light transmissivity may be increased and the intensity of the portion of the light 11 entering a portion 12″ having a high light transmissivity may be decreased. In this manner, an optical image 13 appearing on the other side of the recording sheet 12 has a contrast which is lower than the original contrast of the image carried by the recording sheet 12, and thus the optical image 13 so obtained has the desired contrast.

When, conversely, the image carried by the recording sheet 12 has an excessively low relative density, the intensity of the portion of the light 11 entering the portion 12′ having the low light transmissivity may be decreased and the intensity of the portion of the light 11 entering the portion 12″ having the high light transmissivity may be increased to intensify the contrast of the image carried by the recording sheet 12 in order to obtain thereby an optical image 13 having an intensified contrast.

Figure 3:
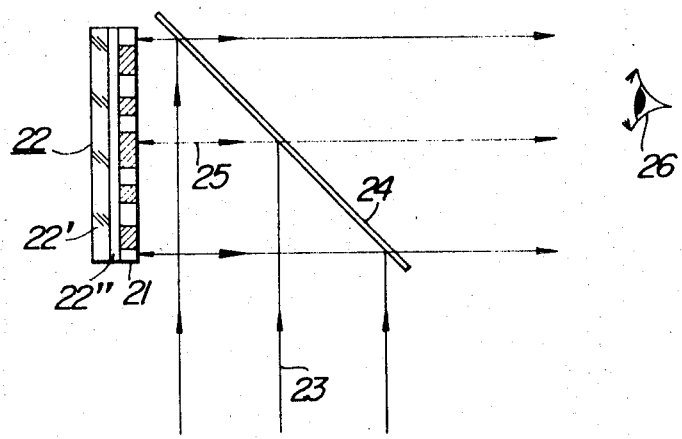
FIGS. 3, 4, 5, 6, 7, 8 and 9 are diagrammatic views showing various embodiments of the image correcting device according to the present invention.

Referring to FIG. 3, there is shown an embodiment having means for obtaining a light source which is intensity-modulated in accordance with the relative light transmissivity of an image carried by a recording sheet 21. The recording sheet 21 may, for example, be a photographic film, and a sheet 22 of phosphor which luminesces in response to excitation with ultraviolet radiation is disposed in intimate contact with the recording sheet 21. The phosphor sheet 33 comprises a backing sheet 22′ such as a glass sheet and a layer 22″ of phosphor such as zinc sulfide sandwiched between the sheets 21 and 22′. Ultraviolet radiation 23 of uniform intensity is projected on the recording sheet or film 21 through a half mirror 24 which reflects ultraviolet light and transmits visible light. As a result, the ultraviolet light which is intensity-modulated according to the relative light transmissivity of an image carried by the film 21 is projected on the phosphor layer 22″, which therefore emits visible light 25 having an intensity distribution corresponding to the relative light transmissivity of the image carried by the film 21. Thus, the phosphor sheet 22 acts as a light source, and the visible light 25 emitted from the light source is subjected to further intensity modulation while passing through the film 21 and is transmitted through the half mirror 24 to enter the eye of an observer 26 for observation.

This embodiment is suitable for intensifying the contrast of an image carried by the film 21 since the portion of the phosphor layer 22″ corresponding to a portion of the film 21 having a high light transmissivity is caused to luminesce intensely. It will be readily seen that this embodiment is especially effective for obtaining a print from a flat and substantially contrast lacking negative or for directly observing such an image because the contrast of the image of on the film 21 is greatly intensified.

Figure 4:
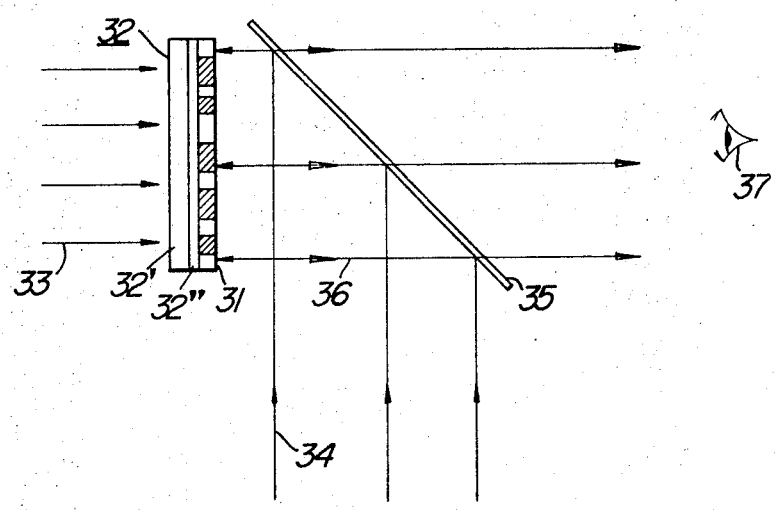

Another embodiment shown in FIG. 4 employs a light source in the form of a luminescent material whose luminous intensity decreases in response to application thereto of a radiant energy input so as to correspondingly reduce the contrast of an image carried by a recording sheet 31. The recording sheet 31 may, for example, be a photographic film, and a sheet 32 of an infrared quenching phosphor is disposed in intimate contact with the photographic film 31. The phosphor has such a property that it luminesces when excited with ultraviolet radiation but its luminous intensity at a portion hit with infrared radiation decreases when the infrared radiation is directed thereto in superposed relation with the ultraviolet radiation. The phosphor sheet 32 comprises a backing sheet 32′ such as a quartz sheet and a layer 32″ of an infrared quenching phosphor such as ZnS:Cu,Co sandwiched between the sheets 31 and 32′. Ultraviolet radiation 33 of uniform intensity is projected on the back face of the phosphor layer 32″ as biasing light. Infrared radiation 34 is projected on the film 31 by being reflected by a half mirror 35. As a result, the infrared light which is intensity-modulated according to the relative light transmissivity of an image carried by the film 31 is projected on the phosphor layer 32′, which therefore luninesces with an intensity distribution corresponding to the relative light transmissivity of the image carried by the film 31.

The luminous intensity of the phosphor is high at a portion corresponding to that portion of the film 31 having a low light transmissivity and low at a portion corresponding to that portion of the film 31 having a high light transmissivity. Thus, the luminous image produced by the phosphor 32″ has its polarity inverted from that produced by the phosphor 22″ in the embodiment shown in FIG. 3. The luminous image appearing on the phosphor sheet 32 thus acts as a source of light, which light is then subjected to a further intensity modulation by the photographic film 31 while passing therethrough, and a visible light output 36 is transmitted through the half mirror 35 to enter the eye of an observer 37 for observation thereby.

The image carried by the photographic film 31 in this embodiment acts upon the intensity of the image output 36 in such a way that the infrared light 34 and the light emitted from the phosphor 32″ cancel each other, and thus the contrast of the image output 36 can be determined according to the luminescent property of the phosphor 32″. Needless to say, in such an application, the image carried by the film 31 can be suitably corrected to obtain a low contrast. Furthermore, a negative image output 36 having its relative density inverted with respect to that of the image on the film 31 may be obtained when the absolute value of the gamma value $|\gamma|$, which determines the variation in the luminous output 36 of the phosphor layer 32" relative to the intensity of the infrared light 34, is so selected as to be larger than one.

From the foregoing description, it will be understood that the property of an image formed on a recording sheet such as a photographic film by modulating the light transmissivity thereof can freely be corrected in accordance with the present invention which employs a light source having a luminous intensity distribution corresponding to the relative light transmissivity of the image carried by the recording sheet.

Furthermore, it will be understood that the device according to the present invention for modifying an image formed on a recording sheet comprises a layer of a radiation-sensitive luminescent material such as phosphor disposed in intimate contact with the recording sheet, and means for directing radiation of uniform intensity to the luminescent material layer through the recording sheet in order to excite the luminescent material. Since, with such an arrangement, the the luminescent material acting as light source luminesces with an intensity corresponding to the relative light transmissivity of the image to be corrected, the image carried by the recording sheet can freely be corrected depending on the property of the luminescent material. Moreover, the device has a very simple structure because it merely comprises a layer of a luminescent material brought into intimate contact with a recording sheet.

Figure 5:
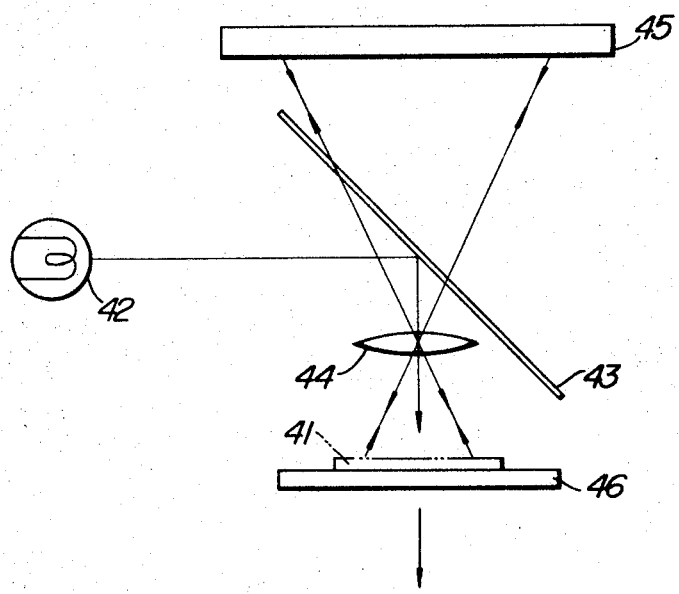

In a further embodiment of the present invention shown in FIG. 5, a recording sheet 41 such as a photographic film carries thereon an image which is to be corrected for visual display or which is to be projected on a sensitive surface. Light of uniform intensity from an auxiliary light source 42 which may be a ultraviolet light lamp is projected through a half mirror 43 and a lens system 44 on the recording sheet 41. A semitransparent plate 46 having a reflective surface is disposed beneath the recording sheet 41. Since the reflection factor on the surface of the recording sheet 41 is distributed in proportion to the distribution of the light transmissivity, the light reflected back from the recording sheet 41 has an intensity distribution corresponding to the relative light transmissivity of the image on the recording sheet 41 and such light is projected through the half mirror 43 on a sheet 45 of phosphor which luminesces depending on the degree of excitation with ultraviolet light. The light reflected back from a portion of the recording sheet 41 having a high light transmissivity is intense and that from a portion having a low light transmissivity is weak.

Since the phosphor 45 luminesces depending on the degree of excitation with ultraviolet light as described above, the luminescence of the phosphor 45 has an intensity distribution of the same polarity as that of the relative light transmissivity distribution of the image carried by the recording sheet 41. The phosphor 45 now acts as a light source and the light emitted therefrom is projected on the recording sheet 41 again through the half mirror 43 and the lens system 44. Thus, a suitably corrected, reflected optical image can be produced on the recording sheet 41, and the corrected optical image passed through the recording sheet 41 can be observed on the opposite side of the recording sheet 41.

In this application, the contrast of the image formed on the recording sheet 41 can be intensified because the phosphor 45 which luminesces in response to excitation with ultraviolet light is associated therewith. When, however, the phosphor 45 is an infrared quenching phosphor and the auxiliary light source 42 is an infrared light lamp, the luminescence of an image portion hit by the infrared light will decrease and thus the contrast of the image can be reduced.

From the foregoing description, it will be understood that the present embodiment for correcting an image formed on a recording sheet comprises a sheet of phosphor disposed opposite to the recording sheet, said phosphor luminescing in response to excitation with ultraviolet light, means for directing exciting radiation of uniform intensity toward the recording sheet, and an optical system for projecting a radiant image reflected from the recording sheet on the phosphor sheet and for projecting a luminous image from the sheet of the phosphor on the recording sheet again. Thus, on the principle of the regression of light, incident light having an intensity distribution corresponding to the relative light transmissivity of the image carried by the recording sheet can be projected on the recording sheet, and the tone of the image carried by the recording sheet can freely be controlled depending on the property of the phosphor. Furthermore, it will be appreciated that the disposition of the phosphor sheet and the recording sheet in a spaced relationship provides the advantage that an undesirable noise component which may intermix with the luminous output of the luminescent sheet can be eliminated by suitably adjusting the optical system.

Figure 6:
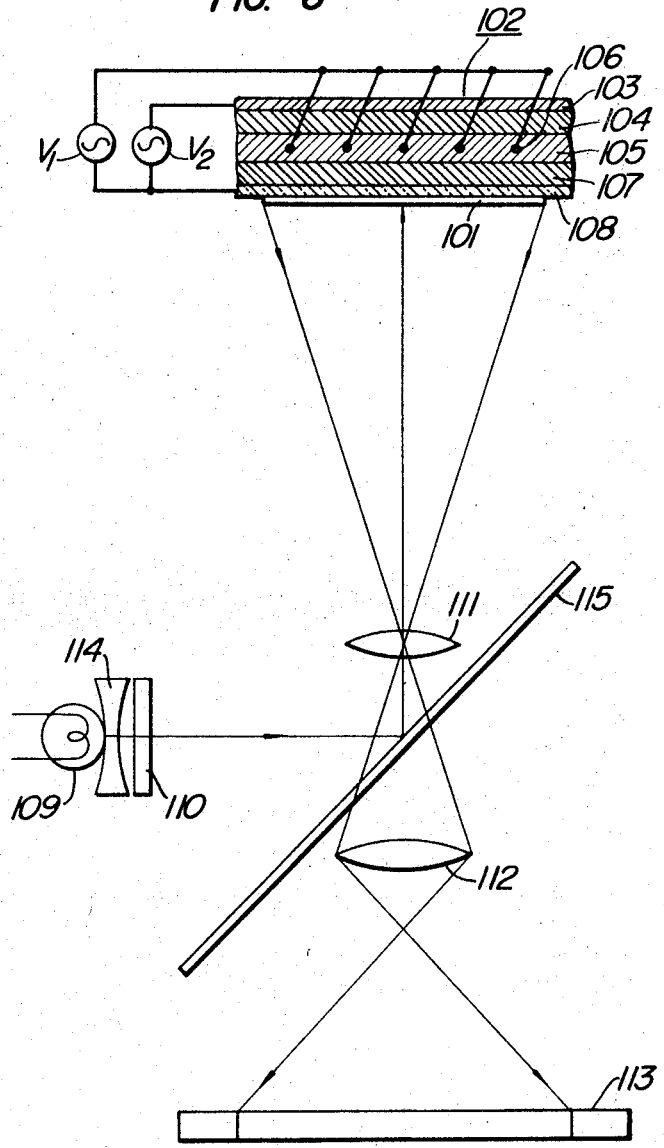

Referring to FIG. 6 illustrating a still further embodiment of the present invention, a recording sheet 101 such as a photographic film carries thereon an image which is to be corrected, and a radiation-sensitive luminescent unit 102 is associated with the recording sheet 101. The radiation-sensitive luminescent unit 102 acts as a light source for emitting light having an intensity distribution corresponding to the relative light transmissivity of the image carried by the recording sheet 101 and has a light-receiving surface disposed on its output side. The recording sheet 101 may, for example, be brought into intimate contact with the light-receiving surface of the radiation-sensitive luminescent unit 102.

The radiation-sensitive luminescent unit 102 comprises a first electrode 103, a layer 104 of a dielectric material, and a layer 105 of an infrared-sensitive material whose resistance is variable in response to the application thereto of infrared light or red light. The infrared-sensitive material may, for example, be a photoconductor such as CdS–CdSe or CdSe which is sensitive to light having a wavelength more than 650 to 700 millimicrons. A gapped second electrode 106 in the form of a parallel grid or a meshed grid is bodily embedded in the infrared-sensitive material layer 105. The radiation-sensitive luminescent unit 102 further comprises a layer 107 of an electrically luminescent material which is pervious to a radiant energy input in the form of infrared light, and a transparent third electrode 108 disposed on the external surface of the electrically luminous material layer 107. The electrically luminescent material may, for example, be a mixture of a green-emitting phosphor such as zinc sulfide and a plastic or a similar infrared-pervious binder. An AC voltage $V_2$ is applied across the first electrode 103 and the third electrode 108, while an AC voltage $V_1$ is applied across the second electrode 106 and the third electrode 108. Any detailed description as to the operation of the energy-sensitive luminescent unit 102 will not be given herein, but it will be understood that, through suitable regulation of the relation between the amplitude or phase of the two voltages $V_1$ and $V_2$, the electrically luminescent layer 107 produces a positive or negative visible optical image in response to the application of a radiant energy image input, and the black-to-white ratio, the gamma value and the like of the output image can be varied over a wide range.

The infrared light is supplied from an infrared light lamp 109 and is passed through a condenser lens system 114 and a visible light intercepting filter 110 so as to cut off the visible spectrum portion of the light. The infrared light is then reflected by a half mirror 115 and is passed through a lens 111 and the photographic film 101 disposed on the light-receiving surface of the energy-sensitive luminescent unit 102 and further through the transparent third electrode 108 and the light-pervious electrically luminescent layer 107 to be projected on the infrared-sensitive layer 105.

Thus, the infrared light projected on the infrared-sensitive luminescent unit 102 has an intensity distribution corresponding to the relative light transmissivity of the image carried by the film 101, and accordingly, the electrically luminescent layer 107 emits visible green light which has an intensity distribution corresponding to the relative light transmissivity of the image carried by the film 101. Since the optical output from the electrically luminescent layer 107 is passed through the film 101 again, the optical image passed through the film 101 differs now from the original image on the film 101 and its tone can freely be regulated in accordance with the input-output characteristic of the luminescent unit 102 which is primarily determined by the relation between the amplitude or phase of the two voltages $V_1$ and $V_2$. The visible image corrected in this manner may be observed in that form or may be projected through the half mirror 115 and a lens system 112 on a sensitive sheet 113 to obtain a print as shown.

In the embodiment illustrated in FIG. 6, the visible light intercepting filter 110 is employed to cut off the visible spectrum portion of the light, but a further satisfactory separation of light can be effected by employing, in lieu of the half mirror 115, a dichroic mirror which reflects infrared light and transmits visible light or reflects the wavelengths which are longer than red visible light (for example, a wavelength longer than 650 millimicrons in case of printing on a sensitive sheet) and transmits the wavelengths shorter than red visible light. In such a case, the filter 110 may be dispensed with.

The recording sheet 101, that is, the photographic film may be disposed in a suitably spaced relationship from the luminescent unit 102 although the film 101 is illustrated as brought into intimate contact with the luminescent unit 102 in FIG. 6. Alternatively, the photographic film 101 which is the recording medium may be disposed between the half mirror or dichroic mirror 115 and the lens system 111 so that red light or infrared light passed through the film 101 may be projected through the lens system 111 on the infrared-sensitive layer 105. In this latter case, the luminous image output from the electrically luminescent layer 107 is focused by the lens system 111 to form an image on the film 101 disposed between the lens system 111 and the half mirror or dichroic mirror 115, and the optical image passed through the film 101 may be observed on the sensitive sheet 113 or may be projected through the lens system 112 on a screen.

In the case in which the sensitive sheet 113 is disposed on the projection plane in order to obtain a print, the emission spectrum of the electrically luminescent layer 107 may suitably be selected (commonly, at a value shorter than 650 millimicrons) in order that the sensitive sheet 113 can satisfactorily be sensitized, and at the same time, the transmission and reflection spectrum distribution of the filter 110 and the half mirror or dichroic mirror 115 may be suitably be selected so that the light having a spectrum which may sensitize the sensitive sheet 113 may not be projected on the sensitive sheet 113.

From the foregoing description, it will be understood that the present embodiment for correcting an image formed on a recording sheet comprises a light source which is an energy-sensitive luminescent unit having an electrically luminescent layer and a radiation-sensitive layer, and means for directing toward the radiation-sensitive layer a radiant ray having an intensity distribution corresponding to the relative light transmissivity of the image carried by the recording sheet. Thus, an image of any desired tone or, furthermore, an image of opposite polarity can freely be obtained by suitably regulating the operating characteristic of the energy-sensitive luminescent unit. In addition, according to the arrangement in the present embodiment, the energy-sensitive layer and the electrically luminescent layer in the energy-sensitive luminescent unit are so selected that the region of sensitive wavelengths of the former does not appreciably overlap the region of emission wavelengths of the latter, and the incident light and the luminous output enters and leaves, respectively, the luminescent unit at the same surface. This arrangement is advantageous in that the light having an intensity distribution corresponding to the relative light transmissivity of the image carried by the recording sheet can accurately be projected on the recording sheet without requiring any troublesome optical adjustments.

More precisely, a proposal has previously been made in an attempt to correct an image by employing such an energy-sensitive luminescent unit. The previously proposed arrangement comprises a first optical system for projecting an image carried by a recording sheet on a light-receiving surface, and a second optical system for projecting a luminous image output of the luminescent unit on the recording sheet, and thus the use of two independent optical systems leads to the difficulty of exact superposition of the images and the necessity for troublesome adjustments. Furthermore, the prior arrangement requires a luminescent unit of extremely high amplification for the successful correction of the contrast. In this respect, it will be appreciated that the present embodiment of the invention is advantageous over the prior art arrangement in that such a troublesome adjustment is utterly unnecessary as the light-receiving surface and the luminescent surface are disposed on the same side of the luminescent unit and there is utterly no restriction as to the amplification of the luminescent unit.

Figure 7:
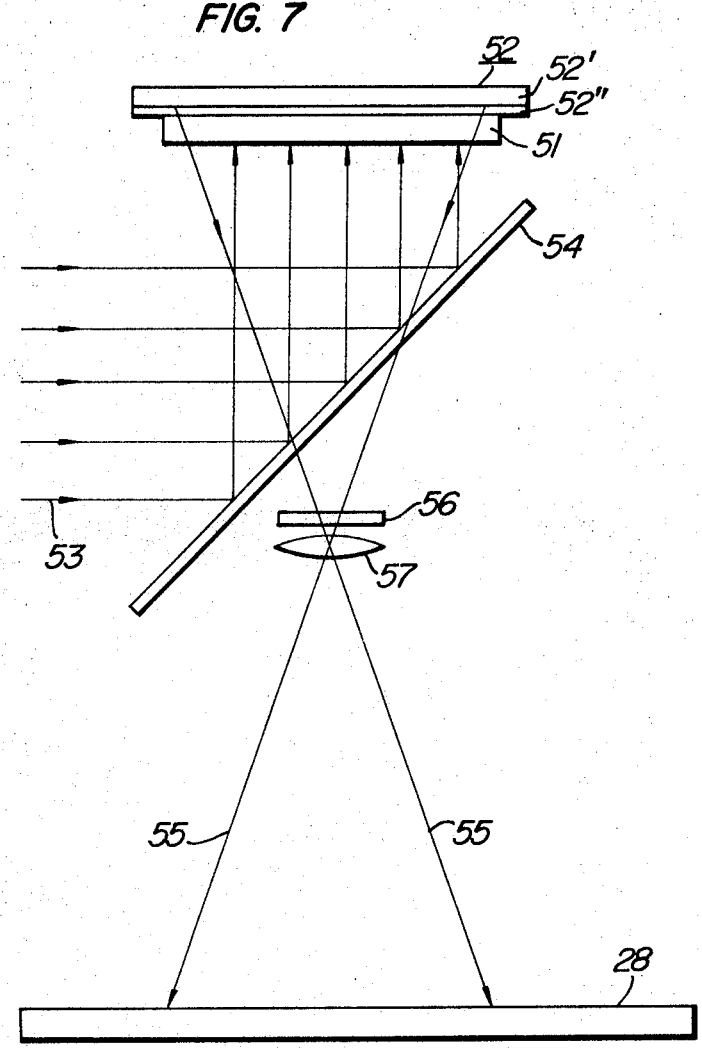

An image correcting and printing device embodying the present invention will next be described in detail. Referring to FIG. 7, there is shown practical means for obtaining a source of light which is intensity-modulated according to the relative light transmissivity of an image carried by a recording sheet 51 such as a photographic film. A sheet 52 of phosphor which luminesces in response to excitation by ultraviolet radiation is disposed in intimate contact with the photographic film 51. The phosphor sheet 52 comprises a backing sheet 52' such as a glass sheet and a layer 52'' of a phosphor such as zinc sulfide sandwiched between the sheets 51 and 52'. Ultraviolet radiation 53 of uniform intensity if projected by a half mirror 54 on the film 51. As a result, the ultraviolet light which is intensity-modulated depending on the relative light transmissivity of an image carried by the film 51 is projected on the phosphor layer 52'', which therefore emits visible light 55 having an intensity distribution corresponding to the relative light transmissivity of the image carried by the film 51. Thus, the phosphor sheet 52 acts now as a light source, and the visible light 55 emitted therefrom is passed through the film 51 to be subjected to further intensity modulation, the intensity-modulated visible light 55 being then passed through the half mirror 54, through an optical filter 56 which intercepts the passage of the ultraviolet light 53 but permits the passage of visible light 55, and through a lens system 57 to be projected on a sensitive sheet 58.

The present embodiment is suitable for intensification of the contrast of the image carried by the film 51 since luminescence at a high intensity takes place at the portion of the phosphor sheet 52 which corresponds to the portion of the film 51 having a high light transmissivity. The present embodiment is especially effective for applications where a flat and substantially contrast-lacking negative is to be printed or observed because the contrast of the image on the film 51 can be greatly intensified.

Figure 8:
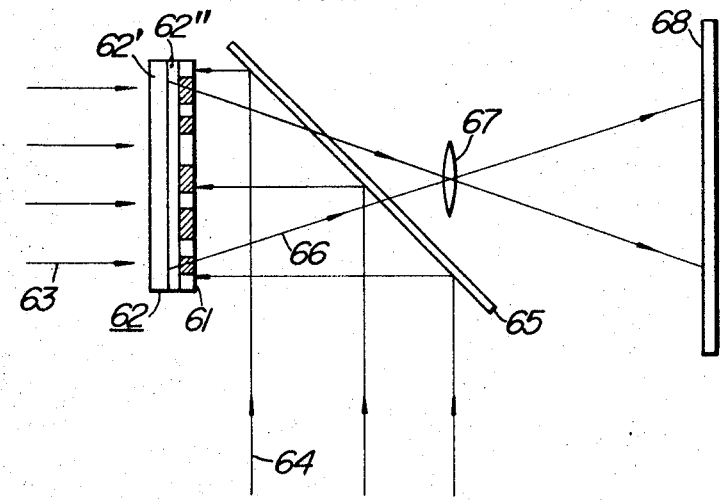

Another embodiment shown in FIG. 8 employs a light source in the form of a luminescent material whose luminous intensity decreases in response to application thereto of a radiant energy input, thereby reducing the contrast of an image carried by a recording sheet 61 which may be a photographic film. A sheet 62 of an infrared quenching phosphor is disposed in intimate contact wit the photographic film 61. The phosphor has such a property that it luminesces when excited with ultraviolet radiation but its luminous intensity at a portion hit with red light or infrared radiation decreases when the red light or infrared radiation is directed thereto in superposed relation with the ultraviolet radiation. The phosphor sheet 62 comprises a backing sheet 62' such as a quartz sheet and a layer 62'' of an infrared quenching phosphor such as $ZnS:Cu,Co$ sandwiched between the sheets 61 and 62'. Ultraviolet radiation 63 of uniform intensity is projected on the back face of the phosphor layer 62'' as biasing light. Red light or infrared radiation 64 is projected on the film 61 through a half mirror 65 which reflects red light and infrared light and permits the passage of visible light but absorbs ultraviolet light. As a result, the infrared light which is intensity-modulated according to the relative light transmissivity of an image carried by the film 61 is projected on the layer 62'' of the infrared quenching phosphor, which therefore luminesces with an intensity distribution corresponding toe the relative light transmissivity of the image carried by the film 61.

The luminous intensity of the phosphor is high at a portion corresponding to that portion of the film 61 having a low light transmissivity and low at a portion corresponding to that portion of the film 61 having a low light transmissivity. Thus, the luminous image produced by the phosphor 62'' has its polarity inverted from that produced by the phosphor 52'' in the embodiment shown in FIG. 7. The luminous image appearing on the phosphor sheet 62 thus acts as a source of light, which light is then subjected to a further intensity modulation by the photographic film 61 while passing therethrough, and a visible light output 66 is transmitted through the half mirror 65 and a lens system 67 to be projected on a sensitive sheet 68.

The image carried by the photographic film 61 acts upon the intensity of the image output 66 in such a way that the infrared light 64 and the light emitted from the phosphor 62'' cancel each other, and thus the contrast of the image output 66 can be determined according to the luminescent property of the phosphor 62''. It is thus possible to correct the contrast of the image carried by the film 61.

The gamma representing the interrelation between the intensity of the luminous output 66 of the infrared quenching phosphor layer 62'' and the intensity of the incident light 64 shows a negative value, and its absolute value $|\gamma|$ is a function of a decrement in the intensity of the biasing ultraviolet light 63 and a function of an increment in the intensity of the incident light 64 which is infrared light or red visible light. Since the contrast of the optical image output 66 is a function of the gamma value, suitable means for regulating or varying the intensity of the light 63 as well as that of the light 64 may be provided in order to freely regulate or vary the contrast of the optical image output 66.

In the range $0 \leq |\gamma| < 1$, the regulation or variation of the contrast can be effected without varying or inverting the polarity of the image, and the contrast of the optical image output is more weakened as $|\gamma|$ becomes larger. On the other hand, in the range $|\gamma| < 1$, the relative density of the optical image output 66 is inverted from that of the image on the photographic film 61, thus the image output 66 having an inverted polarity, and the relative density, that is, the contrast is more strengthened as $|\gamma|$ becomes larger. In the former case, a negative picture of the image carried by the film 61 is printed on the sensitive sheet 68, while in the latter case, a positive picture of the image carried by the film 61 is printed on the sensitive sheet 68, and in both cases, the contrast of the image can be regulated or varied over a wide range.

Figure 9:
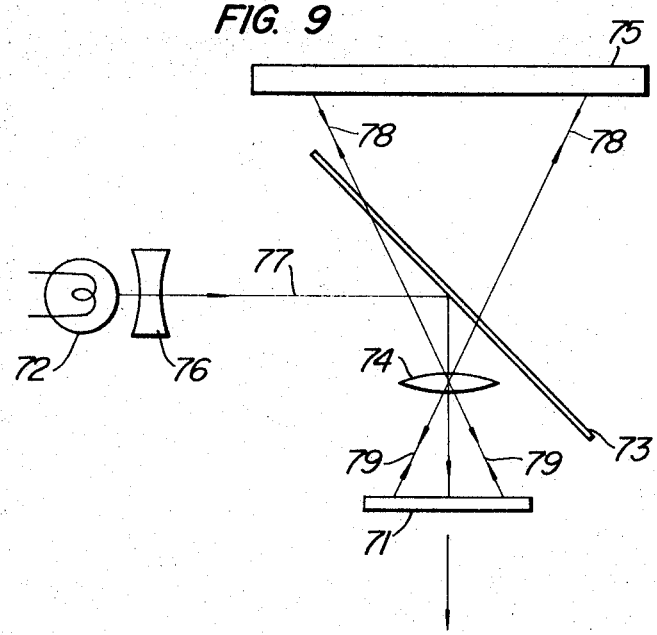

In still another embodiment shown in FIG. 9, a sheet 75 of a luminescent material such as phosphor is disposed in spaced relation from a recording sheet 71 such as a photographic film and luminesces with an intensity distribution corresponding to the relative light transmissivity of an image carried by the photographic film 71. Light 77 of uniform intensity emitted from an auxiliary light source 72 such as a ultraviolet light lamp is projected through a condenser lens system 76, a half mirror 73 and a lens system 74 on the photographic film 71. Since the reflection factor on the surface of the film 71 is distributed in proportion to the distribution of the light transmissivity, the light 78 reflected back from the film 71 has an intensity distribution corresponding to the relative light transmissivity of the image on the film 71 and such light is projected through the half mirror 73 on the sheet 75 of phosphor which luminesces depending on the degree of exc- itation with ultraviolet light as in the embodiment illustrated in FIG. 7. The light reflected back from a portion of the film 71 having a high light transmissivity is intense and that a portion having a low light transmissivity is weak. Since the phosphor 75 luminesces depending on the degree of excitation with ultraviolet light as described above, the luminous output 79 of the phosphor 75 has an intensity distribution of the same polarity as that of the relative light transmissivity distribution of the image carried by the film 71. The phosphor sheet 75 now acts as a light source and the luminous image output 79 emitted therefrom is projected on the film 71 again through the half mirror 73 and the lens system 74. Thus, a suitably corrected optical image appears on the opposite side of the film 71.

In this application, the contrast of the image on the film 71 can be intensified because the phosphor 75 which luminesces in response to excitation with ultraviolet light is associated therewith. However, when the phosphor 75 is an infrared quenching phosphor as illustrated in FIG. 8 and the auxiliary light source 72 is an infrared light lamp, the luminescence of an image portion hit by the infrared light will decrease and thus the contrast of the image can be reduced or the polarity of the image can be inverted.

A sensitive sheet may be disposed beneath the film 71 in intimate contact therewith for the sake of contact printing or may be disposed in suitably spaced relation from the film 71 and the optical image appearing from the film 71 may be projected through a suitable projection lens system on the sensitive sheet to sensitize the same. In this latter case, a filter which intercepts the ultraviolet light or infrared light coming from the auxiliary light source 72 but permits free passage of the visible luminous output from the luminescent sheet 75 may be disposed in the front or in the back of the projection lens system in order to prevent the sensitive sheet from being sensitized by the light 77 emitted from the auxiliary light source 72. Thus, in the present embodiment based on the principle of the regression of light, incident light having an intensity distribution corresponding to the relative light transmissivity of the image carried by the recording sheet can be projected on the recording sheet, and the tone of the image carried by the recording sheet can freely be controlled depending on the property of the phosphor. Furthermore, it will be appreciated that the disposition of the phosphor sheet and the recording sheet in a spaced relationship provides the advantage that an undesirable noise component which may intermix with the luminous output of the luminescent sheet can be eliminated by suitably adjusting the optical system. Moreover, a contact print can easily be obtained by bringing a sensitive sheet in intimate contact with the photographic film and sensitizing the sensitive sheet. Furthermore, it is to be noted that the various optical systems illustrated in FIGS. 6 to 9 may be suitably interchanged or combined to suit particular applications.

From the foregoing description, it will be understood that the present embodiment comprises a luminescent means which emits light having an intensity distribution corresponding to the relative light transmissivity of an image to be corrected, which is carried by a recording sheet such as a photographic film, and projects such light on the photographic film, and an optical system for projecting an optical image appearing from the recording sheet on a sensitive sheet. Thus, it is possible to obtain a positive or a negative of any desired tone irrespective of the original tone of the image carried by the recording sheet, and a picture having the best tone can easily be obtained without prior necessity for the adoption of the optimum sensitive sheet suitable for the purpose. Furthermore, successful printing of an image having an excessively high contrast or an excessively low contrast which has been impossible according to the prior technique is realized by the present invention and such an image can be turned into a positive picture having a normal tone.

I claim:

1. An image correction device comprising a transparent plate having a reflective surface, said plate being adapted to support a transparency on said reflective surface, a phosphor screen disposed opposite to and spaced from said reflective surface of said transparent plate, optical means disposed between said transparent plate and said phosphor screen for focusing an image contained in a transparency placed upon said transparent plate on said phosphor screen, and means for uniformly irradiating said transparency on the side facing said phosphor screen.

2. An image correction device as defined in claim 1, wherein said irradiating means comprises ultraviolet radiation means.

3. An image correction device as defined in claim 1, wherein said phosphor screen is formed of infrared quenchable phosphor and said irradiating means comprises ultraviolet radiation means.

4. An image correction device comprising a radiation-sensitive luminescent element; said element having an electroluminescent layer, an energy-sensitive layer, materials of said energy-sensitive layer being chosen so that the sensitive wavelength range thereof and the luminescent wavelength range of the electroluminescent layer do not largely overlap, and a dielectric layer; said three layers being laminated in mentioned order an interposed between a first planar electrode and a second planer and transparent electrode; a third foraminate electrode being embedded in said energy-sensitive layer; said second transparent electrode being adapted to receive a transparency thereon; AC power sources respectively connected between said first and second electrodes and between said second and third electrodes; and means for focusing an image contained in a transparency placed upon said second electrode on a sensitive sheet to be placed opposite to said radiation-sensitive luminescent element.

5. An image correction device as defined in claim 4, further comprising means for uniformly irradiating a transparency placed on said second electrode with infrared rays.

UNITED STATES PATENT OFFICE
CERTIFICATE OF CORRECTION

Patent No. 3,575,510            Dated April 20, 1971

Inventor(s) Tadao KOHASHI

It is certified that error appears in the above-identified pate and that said Letters Patent are hereby corrected as shown below:

Four of the Japanese priority applications are no listed and should be listed as follows:

Japan, Patent Appln. N° 25652/67 filed April 18, 1967;
Japan, Patent Appln. N° 25560/67 filed April 19, 1967;
Japan, Patent Appln. N° 25943/67 filed April 21, 1967; and
Japan, Patent Appln. N° 26759/67 filed April 24, 1967.

Signed and sealed this 28th day of December 1971.

(SEAL)
Attest:

EDWARD M. FLETCHER, JR.          ROBERT GOTTSCHALK
Attesting Officer                  Acting Commissioner of Pa